United States Patent
Gebreselassie et al.

(10) Patent No.: US 6,299,811 B1
(45) Date of Patent: Oct. 9, 2001

(54) METHOD OF RECYCLING POLYURETHANE FOAM COMPONENTS

(75) Inventors: Girma M. Gebreselassie, Southfield; Harold G. Wolf, Jr., Gibralter; Kurt C. Frisch, Grossile; Daniel Klempner, West Bloomfield; Vahid Sendijarevic, Troy, all of MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/298,132

(22) Filed: Apr. 23, 1999

(51) Int. Cl.$^7$ ................................................. B29C 43/02
(52) U.S. Cl. .................... 264/115; 264/122; 264/911; 264/916
(58) Field of Search .................... 264/115, 122, 264/916, 911, 126

(56) References Cited

U.S. PATENT DOCUMENTS

| | | | |
|---|---|---|---|
| 4,666,646 | * | 5/1987 | Chang ................................ 264/109 |
| 5,185,380 | * | 2/1993 | Diessel et al. ........................ 521/49 |
| 5,503,788 | * | 4/1996 | Lazareck et al. .................... 264/115 |
| 5,525,278 | * | 6/1996 | Krosch et al. ...................... 264/45.3 |
| 5,676,895 | * | 10/1997 | Toivola et al. ...................... 264/112 |
| 5,807,513 | | 9/1998 | Gebreselassie et al. ............ 264/37.3 |

OTHER PUBLICATIONS

Recycling and Reuse of Polyurethanes—Miles Polymers Division—1993—pp. 4 through 6.
Solid State Shear Extrusion for Pulverization of Flexible and Rigid Polyurethane Foam Wastes—Paper from the Polyurehanes World Congress—1993.
Pulverized Polyurethane Foam Waste as a Reinforcing Agent for Virgin PUR Foams—Paper from the Polyurethane Expo—1996.

* cited by examiner

Primary Examiner—Mary Lynn Theisen
(74) Attorney, Agent, or Firm—MacMillan, Sobanski & Todd, LLC

(57) ABSTRACT

A method for recycling materials including a significant portion of polyurethane foam includes forming the foam into a fluff of particle sized 0.25–1.0, and most preferably 0.25–0.50 inch. The material is moved to a mold and molded at an elevated temperature and pressure. Preferably, the glass transition temperature of the foam is exceeded. Other filler materials may be mixed with the fluff material. The invention recycles scrap which includes polyurethane foam, but greatly reduces the complexity of re-utilizing the scrap.

17 Claims, 1 Drawing Sheet

METHOD OF RECYCLING POLYURETHANE FOAM COMPONENTS

BACKGROUND OF THE INVENTION

This invention relates to a simplified method of recycling vehicle trim components and other scrap materials incorporating urethane foam.

In the prior art, many components which are utilized in automobiles include a significant portion of urethane foam. As one example, the seat foam typically utilized to provide cushion in a vehicle seat is a urethane-based foam. Another example is found in vehicle headliners. The seat foam is typically trimmed prior to insertion into the seat, and thus, at the manufacturing site, there is a good deal of excess or waste foam trimmed away from the final desired foam. The same is true of headliners, which are initially molded and then cut to a desired shape.

Thus, at a vehicle trim manufacturing site, there is often a good deal of waste material. A large volume of waste material includes polyurethane foam. In some cases, the waste material could include many other materials. As an example, a vehicle headliner could include nylon, polyester, cellulose films, glass fibers, and even natural fiber layers. In the past, it has been very difficult to recycle these components since they include so many distinct materials.

One recent method mixed these materials into a shredded fluff, and then mixed a binder into the fluff. This invention is disclosed in U.S. Pat. No. 5,807,513. In this patent, it was recognized that in order to provide binder to all of the several pieces of fluff, the binder would be desirably carried in a water.

Further, it is known in the prior art to take flexible polyurethane foam, only the foam, and grind it into a powder, with particles on the order of the microns. This powder has then been pressed into a sheet of material. While this has been proposed as a way to utilize waste polyurethane foam, it has not been used in production. Moreover, it has never been proposed to use ground polyurethane foam as a binder for other non-polyurethane materials.

Many types of materials are generated as waste in a vehicle trim manufacturing plant. While polyurethane foam-containing materials may benefit from the above prior art, there are also many other materials which have not been as adaptable to recycling.

Further, while industry does desirably wish to gain recycling as a benefit, in the end, cost is an overriding factor. Thus, if the recycling is not cost effective, it will not occur in large part. The above-described method of grinding into a powder is not cost effective.

The present invention is directed to a method of using polyurethane foam as a binder.

SUMMARY OF THE INVENTION

Applicant has discovered that when trim component waste material including a significant portion of polyurethane foam is formed into a fluff, it can be molded into a trim part without any separate binder being necessary. The recycled foam serves as a binder. To achieve this objective, the scrap must be molded under elevated heat and pressure such that the foam exceeds its glass transition temperature.

The present invention only requires that the waste material be made into particles on the size of fractions of an inch, and not as small as the powder in the proposed prior art use of polyurethane foam without binder. In particular, the present invention preferably utilizes particles between 0.25 and 1.0 inch. Most preferably, the particles are formed to be on the order of 0.25–0.50 inch.

The present invention generally includes the step of taking a waste material including polyurethane foam and forming it into particles in the desired range. Those particles are then moved into a mold and exposed to both compression and heat. The glass transition temperature of the foam is exceeded during this molding. No separate binder is included with the particles. The foam can be utilized on its own to form a desired sheet of material for refuse, or additional filler materials can be utilized. The filler materials will most preferably include other waste materials such that the recycling effect of the overall method is greatly improved. Materials such as a resonated fiber scrap or dolomite, have been utilized with the present invention, and have resulted in materials which have desirable characteristics for many trim applications.

The present invention is not necessarily directed to any one particular material, nor is it directed to a particular final use of the material. Instead, the present invention in general recognizes that by utilizing the polyurethane foam as a portion of the recycled material, no separate binder need be utilized.

In embodiments of this invention, the material can be made to different stiffnesses, thicknesses and resiliencies by controlling mold temperature, pressure and time. Also, properties can be controlled by selecting type and ratio of polyurethane foam as the binder, as well as filler types. Controlling of these various variables to achieve a desired final sheet is within the skill of a worker in this art.

These and other features of the present invention can be best understood from the following specification and drawings, the following which is a brief description.

BRIEF DESCRIPTION OF THE DRAWINGS

The FIGURE is a flow chart depicting the steps of the present invention.

DESCRIPTION OF THE PRESENT INVENTION

Figure 1:
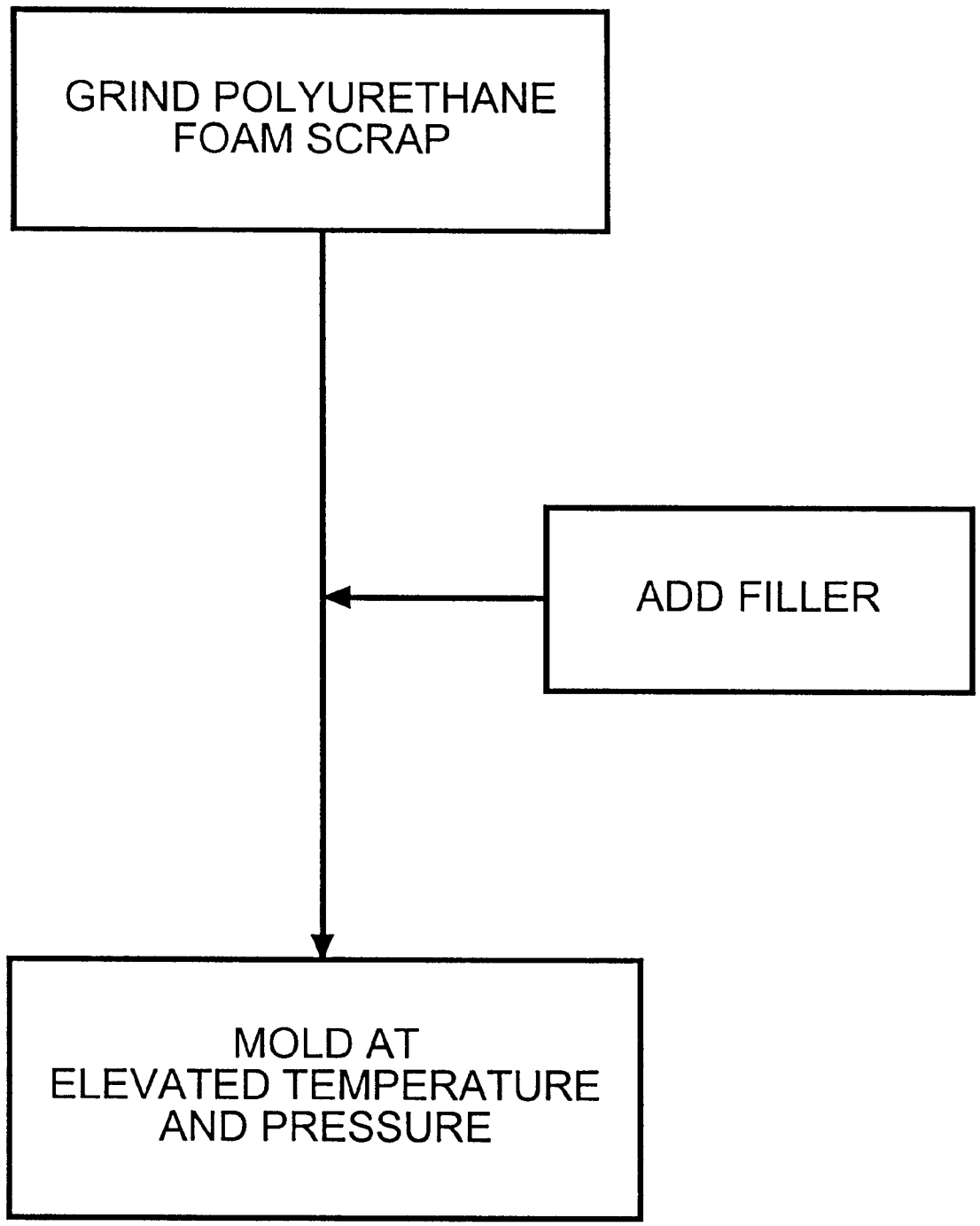

The flow chart as shown in the figure describes the method of this invention. A manufacturing scrap is initially shredded. Shredding takes place to reduce the size of the scrap on the order of 0.25–1.0 inch, and most preferably 0.25–0.50 inch. The scrap must contain a significant portion of polyurethane foam. The polyurethane foam can be rigid, semi-rigid or flexible. A filler may also be utilized. If so, a mixing step may occur. The filler may be any other material which is to be recycled. As an example, resonated fiber (shoddy) is a material which is often a waste product in manufacturing trim facilities. However, to date, this material has not been easily recycled. Alternatively, materials such as dolomite, or other materials may be utilized.

The flow chart is somewhat simplified. In fact, the filler may be the main component and the polyurethane foam only used for the binder function. Further, with different materials that do contain polyurethane foam, it may be desirable to add additional polyurethane foam content to achieve a desired result.

In addition, the manufacturing scrap could be formed of a number of materials in addition to polyurethane foam. As an example, if the manufacturing scrap is from a headliner, then the scrap will typically include a number of layers other than the polyurethane foam layers.

The materials are moved into a forming mold, and a prepreg sheet is formed. The sheet may then be formed into trim components in a final mold. For this application, "trim components" is a generalized term for a number of different products which could be formed in the mold. As an example, sealants such as gaskets, under carpeting layers, rigid trim components, or even consumer items could be formed by the materials. The present invention provides an ability to form a number of different type materials with a relatively simple method.

EXAMPLE 1

In a first example, a polyurethane core headliner scrap containing flexible and semi-rigid urethane foam along with glass fibers and other non-urethane materials was formed into a fluff by shredding. The materials were then moved into a mold, and molded at a pressure of 600–1200 psi and at temperatures of 400–475° F. using a carver press.

The molded products exhibited physical properties similar to those having 10% binder made by a method such as disclosed in the U.S. Pat. No. 5,807,513.

EXAMPLE 2

A resonated fiber (shoddy) scrap was mixed with a flexible seating foam scrap. The seating foam scrap was flexible polyurethane foams. The mixture was molded under the same conditions as described with example 1. This experiment was initially carried out in a ratio of 25% shoddy and 75% foam scrap. The mechanical properties of the resulting product depend greatly upon curing temperatures such as temperature, pressure and time. However, the resultant product had desirable physical characteristics.

OTHER EXAMPLES

Other examples include changing the ratio between the shoddy and foam scrap to 25% foam scrap and 75% shoddy scrap. Again, characteristics which would be desirable for various applications were found in the product. In addition, dolomite was utilized with the foam scrap. The samples were made with both 25% dolomite and 75% dolomite. Again, desirable physical characteristics were achieved.

Also, rigid polyurethane foam and shoddy were mixed in a 50%/150% material. This material displayed useful characteristics.

In summary, the present invention relates to a method of re-using a waste material including a significant portion of polyurethane foam. The polyurethane foam is used as a binder. To achieve this, the polyurethane foam is molded at a temperature and pressure such that its glass transition temperature is exceeded. Other products may be mixed into the fluff of polyurethane foam. However, no substantial separate binder percentage is included. The physical characteristics of the resultant product can be tailored for a desired application, and a worker of ordinary skill in the art would recognize how the various mixtures, temperature, pressure and mold time could all be controlled to achieve a desired final product.

It is believed that the polyurethane foam provides a binder since hydrogen bonds in the hard segments of the polymers are broken under elevated temperature and pressure. That is, when the foam exceeds its glass transition temperature. For polyurethane foams, this occurs in the 600–1,200 psi and 400–475° F. range. The glass transition temperature is available from reference books or easily determined. The bonds are then re-established upon cooling. Some chemical rearrangements of polar groups in the hard segments may also take place under the conditions of high shear pressure and temperature.

Preferred embodiments of this invention have been disclosed, however, a worker in this art would recognize that certain modifications come within the scope of this invention. For that reason, the following claims should be studied to determine the true scope and content of this invention.

What is claimed is:

1. A component formed by the process of:
   (a) forming a waste material including a rigid polyurethane foam into a fluff having a particle size of 0.25–1.0 inch;
   (b) moving said fluff into a mold, without adding any separate binder material; and
   (c) molding said material at an elevated temperature and pressure.

2. A method of forming a product comprising the steps of:
   (a) shredding a scrap material including a polyurethane foam to form a fluff particles of said fluff being in general between 0.25 and 1.0 inch;
   (b) adding a filler material including dolomite to said fluff; and
   (c) molding said fluff in a mold at an elevated temperature and pressure, without adding any significant amount of a separate binder.

3. A method of forming a product comprising the steps of:
   (a) shredding a scrap material including a rigid polyurethane foam to form a fluff, particles of said fluff being in general between 0.25 and 1.0 inch; and
   (b) molding said fluff in a mold at an elevated temperature and pressure, without adding any significant amount of a separate binder.

4. A method of forming a product comprising the steps of:
   (a) shredding a scrap material including a polyurethane foam to form a fluff;
   (b) adding filler material including dolomite to said fluff; and
   (c) molding said fluff in a mold at an elevated temperature and pressure such that a glass transition temperature of said foam is exceeded, and said step not including the addition of any significant amount of a separate binder.

5. The method of claim 3, wherein no binder is added.

6. The method of claim 3, wherein said scrap material is a headliner scrap material including polyurethane foam along with layers of non-polyurethane.

7. The method of claim 6, wherein said other layers include fiberglass.

8. The method of claim 3, wherein said scrap material is a polyurethane seat foam.

9. The method of claim 3, wherein an additional filler material is added to said fluff prior to the molding step.

10. A method as recited as recited in claim 9, wherein said filler material includes resonated fiber scrap.

11. A method as recited in claim 9, wherein said filler material includes dolomite.

12. A method as recited in claim 3, wherein said elevated pressure and temperature are selected to exceed the glass transition temperature of the foam.

13. The method of claim 4, wherein no binder is added.

14. The method of claim 4, wherein said scrap material is a headliner scrap material including polyurethane foam along with layers of non-polyurethane.

15. The method of claim 14, wherein said other layers includes fiberglass.

16. The method of claim 4, wherein said scrap material is a polyurethane seat foam.

17. A method as recited in claim 4, wherein said filler material further includes resonated fiber scrap.

* * * * *

UNITED STATES PATENT AND TRADEMARK OFFICE
CERTIFICATE OF CORRECTION

PATENT NO. : 6,299,811 B1
DATED : October 9, 2001
INVENTOR(S) : Girma M. Gebreselassie et al.

It is certified that error appears in the above-identified patent and that said Letters Patent is hereby corrected as shown below:

Column 2,
Line 10, delete "resonated" and insert -- resinated --.
Line 9, under Description Of The Present Invention, delete "resonated" and insert -- resinated --.

Column 3,
Line 1, under Example 2, delete "resonated" and insert -- resinated --.

Column 4, claim 2, subparagraph (a),
Line 1, after "including" delete "a".
Line 2, delete "a".

Column 4, claim 2, subparagraph (b),
Line 1, delete "a".

Column 4, claim 10,
Line 2, delete "resonated" and insert -- resinated --.

Column 4, claim 17,
Line 2, delete "resonated" and insert -- resinated --.

Signed and Sealed this

Twenty-sixth Day of March, 2002

Attest:

JAMES E. ROGAN
Attesting Officer    Director of the United States Patent and Trademark Office